United States Patent [19]
Rivera

[11] Patent Number: 5,166,492
[45] Date of Patent: Nov. 24, 1992

[54] LASER POWER CORRELATION SYSTEM

[75] Inventor: Ruben Rivera, Davie, Fla.

[73] Assignee: Motorola, Inc., Schaumburg, Ill.

[21] Appl. No.: 676,021

[22] Filed: Mar. 27, 1991

[51] Int. Cl.$^5$ .............................................. B23K 26/00
[52] U.S. Cl. ............................ 219/121.68; 219/121.62
[58] Field of Search ...................... 219/121.61, 121.62, 219/121.68, 121.69

[56] References Cited

U.S. PATENT DOCUMENTS 4,316,467 2/1982 Muckerheide ................. 219/121.62
4,381,441 4/1983 Desmarais et al. ............. 219/121.69

Primary Examiner—C. L. Albritton
Attorney, Agent, or Firm—M. Mansour Ghomeshi

[57] ABSTRACT

Briefly, according to the invention, a laser trim system (100) for trimming printed components (112) on a circuit carrying substrate (118) is disclosed. The laser trim system (100) includes a laser source (102) for trimming the printed circuit components (112). The laser source (102) has an adjustable power level, suitable for trimming a variety of printed components. The laser trim system (100) also includes a power converter (110) for selectively measuring the power level of the laser source (102). A laser power supply (104) is also included in the laser trim system (100) for adjusting the power level of the laser source (102) in response to the measured power level. The laser trim system (100) further includes a computer (1068) for comparing the measured laser power level with pre-defined levels to determine when a change in the power level is necessary.

14 Claims, 4 Drawing Sheets

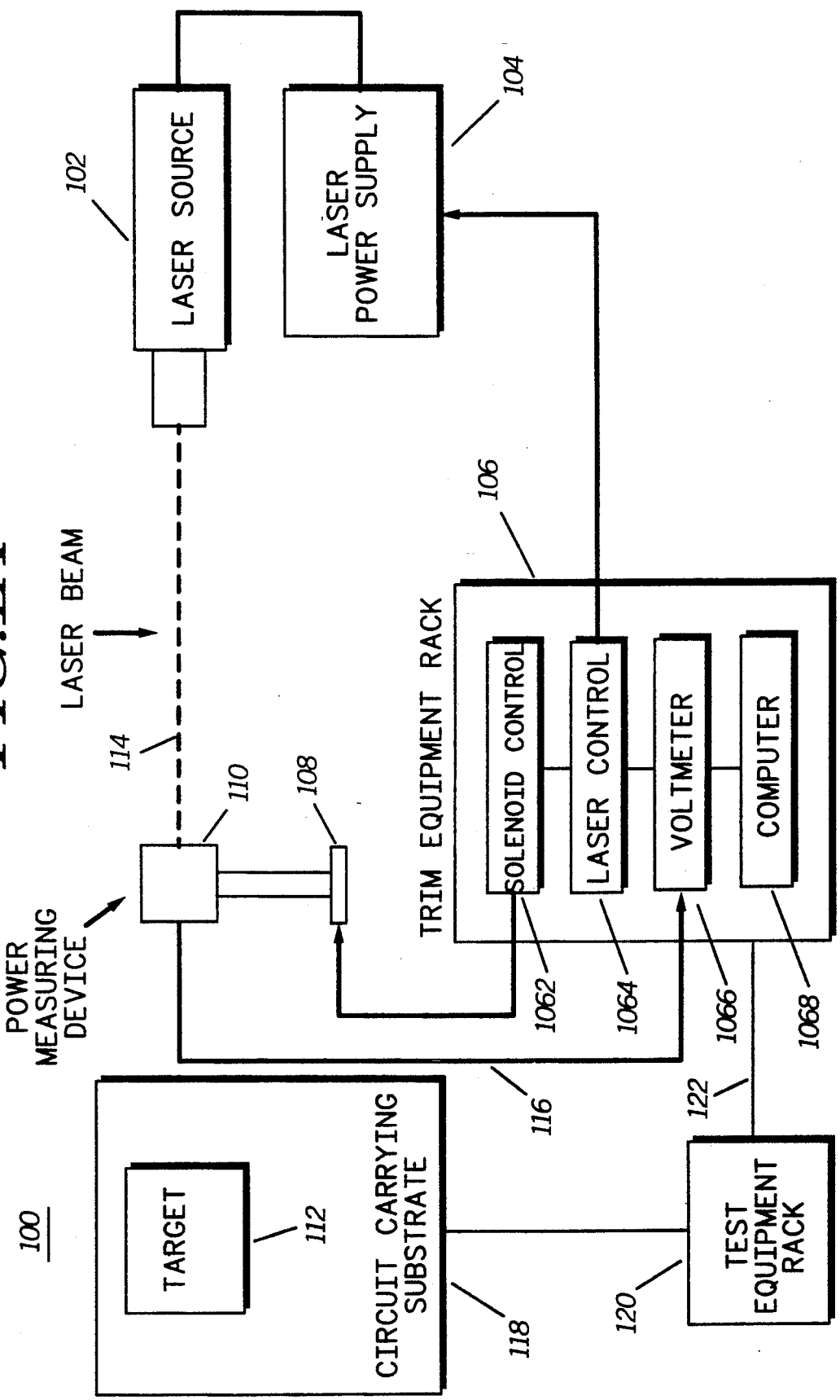

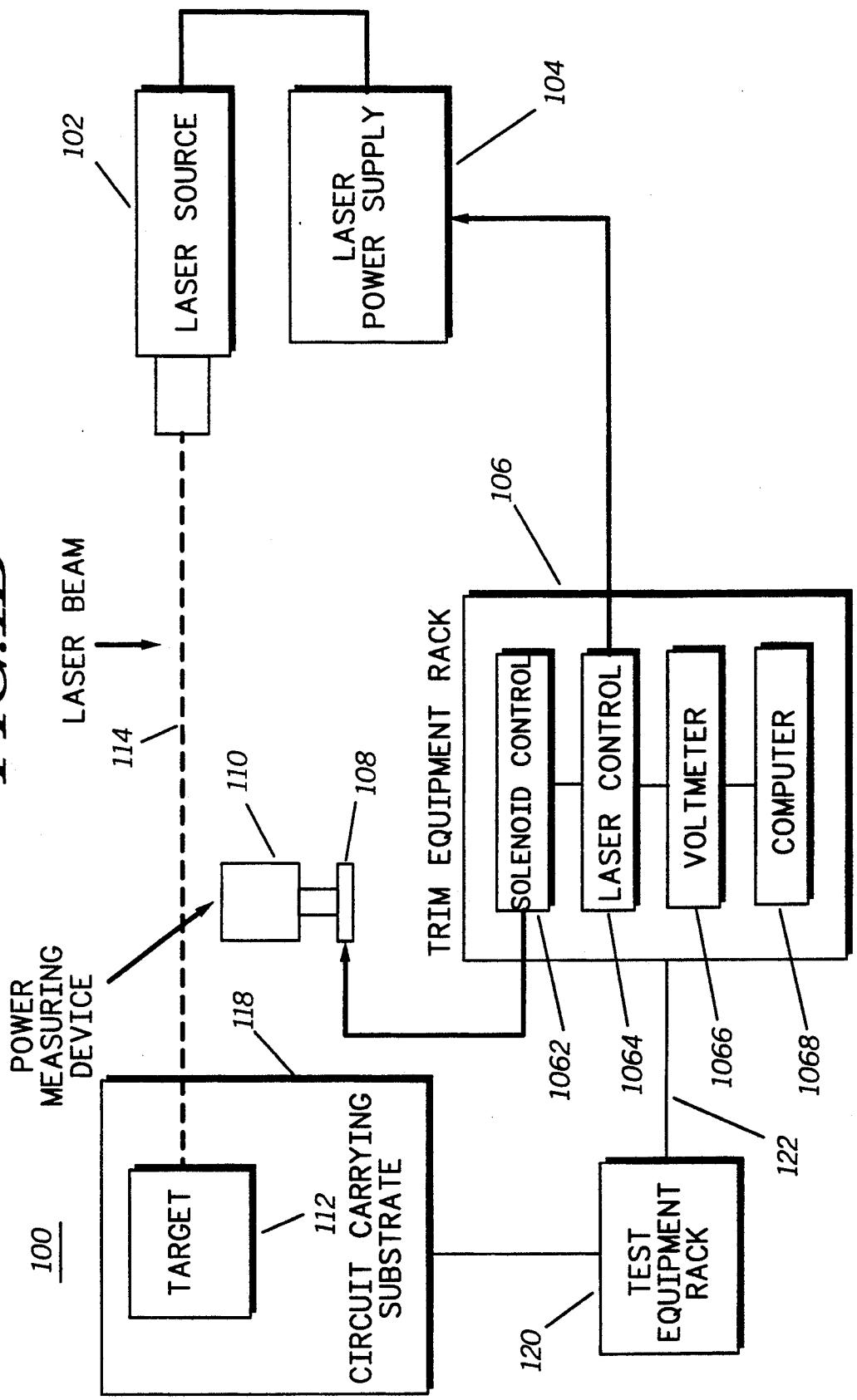

LASER POWER CORRELATION SYSTEM

TECHNICAL FIELD

This invention relates generally to a trimming apparatus and more particularly to a laser trimming apparatus.

BACKGROUND

The use of laser trimming apparatuses for trimming circuit components printed on circuit carrying substrate is well known in the art. These apparatuses generally use a laser source which shoots a laser beam to the surface of the printed circuit component. The heat generated by the laser beam results in the removal of excess material, thereby achieving various component values required by the circuit. In some applications, these circuit components are required to have wide range of values. To achieve this wide range of values, the processes and materials used vary greatly. The laser machines used for trimming these various components must have various power levels suitable for trimming different printed circuit components. In the past a method for trimming the various printed circuit component of a circuit carrying substrate has been to stop the trim and manually adjusting the output power of the laser gun. This method is time consuming and requires operator's interface. It is clear that a need exists for automatically trimming circuit components printed on circuit carrying substrates requiring various power levels.

SUMMARY OF THE INVENTION

Briefly, according to the invention, an apparatus for trimming printed components on a circuit carrying substrate is disclosed. The apparatus includes a trimming means for trimming the printed circuit components. The trimming means has an adjustable power level, suitable for trimming a variety of printed components. The apparatus further includes a measuring device for selectively measuring the power level of the trimming means. A means is included in the apparatus for adjusting the power level of the trimming means in response to the measured power level. The apparatus further includes means for comparing the measured laser power level with pre-defined levels to determine when a change in the power level is necessary.

BRIEF DESCRIPTION OF THE DRAWINGS

FIGS. 1A and 1B are block diagrams of an automatic laser power correlation apparatus in accordance with the present invention.

DETAILED DESCRIPTION OF THE PREFERRED EMBODIMENT

Figure 2A:
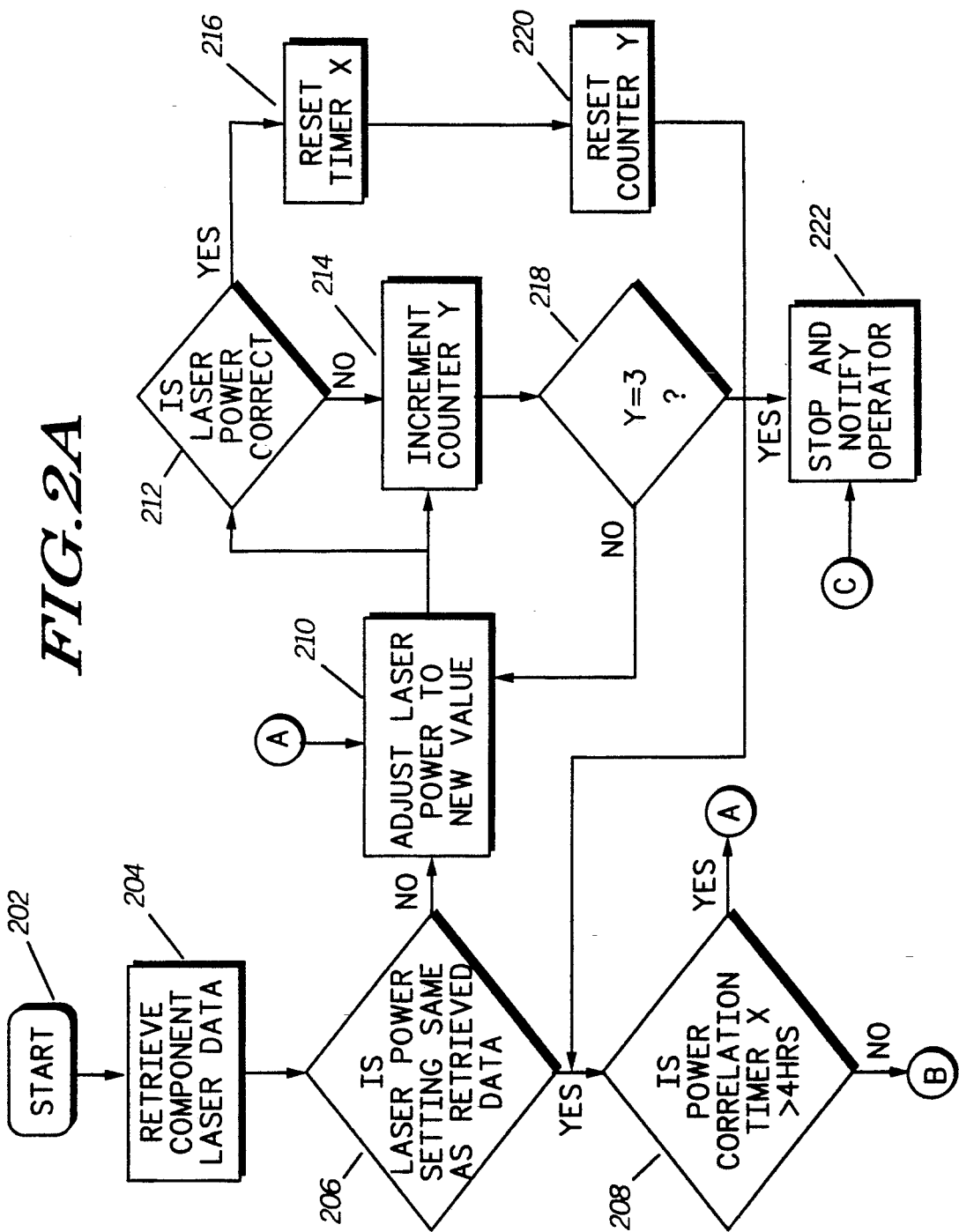
FIGS. 2A and 2B comprise a flow chart of the operation of the automatic laser power correlation apparatus in accordance with the present invention.

Referring first to FIG. 1B, a block diagram of an automatic laser power correlation apparatus 100 is shown in accordance with the present invention. The apparatus 100 includes a laser source 102 that is used to generate a laser beam 114 having an adjustable power level. The laser source 102 provides the trimming means for the apparatus 100 and is a light resonator. The laser beam 114 is used to trim circuit components on a circuit carrying substrate 118. These circuit components may be printed or molded on the circuit carrying substrate using techniques well known in the art. A target 112 represents these components on the circuit carrying substrate 118. The trimming of the target 112 changes the value of the component 112 which results in parametric changes in the operation of the circuit carrying substrate 118. The laser beam 114 is directed to the target 112 using various optical devices such as mirrors (not shown). Those skilled in the art understand the operation of laser trimming systems and the manners in which they vary the value of printed components.

The apparatus 100 includes a power measuring device 110 that is used to measure the laser power. A solenoid 108 engages and disengages the device 110 at the command of a solenoid control device 1062. The solenoid control 1062 is part of a trim equipment rack 106 that includes a laser control 1064, a voltmeter 1066, preferably a digital voltmeter, and a computer 1068. A digital voltmeter is preferred for its digital compatibility with the computer 1068. The trim equipment rack 106 controls the operation of the apparatus 100. The computer 1068 includes a data bank which is used to store information on the laser power requirements of various components being trimmed by the apparatus 100. The apparatus 100 further includes a test equipment rack 120 that contains all the test equipment necessary to test the operation of the circuit carrying substrate 118. The communication of the test equipment rack 120 and the trim equipment rack 106 is provided via the control and signal lines 122. If desired, the test equipment rack 120 can be a part of the trim equipment rack 106.

Referring now to FIG. 1A, the apparatus 100 is shown when it is in the power level detecting mode. The laser beam 114 is interrupted by the power measuring device 110 when the solenoid 108 is engaged. Indeed, the solenoid 108 operates to position the device 110 in the path of the laser beam 114 before it hits the target 112. The power measuring device 110 provides the measuring means of the apparatus 100 and is preferably a converter that converts heat to an electrical signal. More specifically, the device 110 is a power converter that converts the heat generated by the laser source 102 to a voltage signal 116 which is applied to the digital voltmeter 1066. One such device is a power sensor, model No. 205 available from Coherent Inc. The voltmeter 106ε communicates this voltage level to the computer 1068 which converts the voltage level to corresponding laser power levels. With laser power determined, the computer 1068 proceeds to determine whether the power level of the laser beam 114 matches the trimming power requirements of the target 112 stored in its memory bank. In the event that a change in the laser power is required, the computer 1068 commands a laser power supply 104 to increase (decrease) power to the laser source 102. This results in an increase (decrease) in the laser power level at the output of the laser source 102. This closed loop monitors the adjusted laser power to determine its correct level. Once the correct laser power has been achieved, the computer commands the solenoid 108 to disengage via the solenoid control 1062. With the solenoid 108 disengaged, the power measuring device 110 is removed from the path of the laser beam 114 allowing the laser beam 114 to trim the target 112.

The description above refers to a circuit carrying substrate having a single target. It is readily understood that the idea can be applied to substrates having a plurality of targets. With such substrates, the process involves the programming of the trimming apparatus 100 to trim the plurality of targets using the operation described above.

In summary, an apparatus is described that monitors and adjusts the laser power level of a laser source using a closed loop. The automatic laser power correlation apparatus 100 is used to control and adjust the power level of the laser beam 114 produced by a laser source 102. The laser beam 114 is used to trim printed circuit components requiring variable laser power levels such as the target 112. Prior to trimming the target 112, the power measuring device 110 interrupts the laser beam 114 and measures its power level. This power level is then communicated to a computer 1068 which has information on the power requirements of the target 112. In the event that changes in the laser power are deemed necessary, the computer 1068 adjusts the output power of a laser power supply 104 accordingly. The variations in the output power of the laser power supply 104 is directly translated into variations in the power of the laser beam 114 generated by the source 102.

Figure 2B:
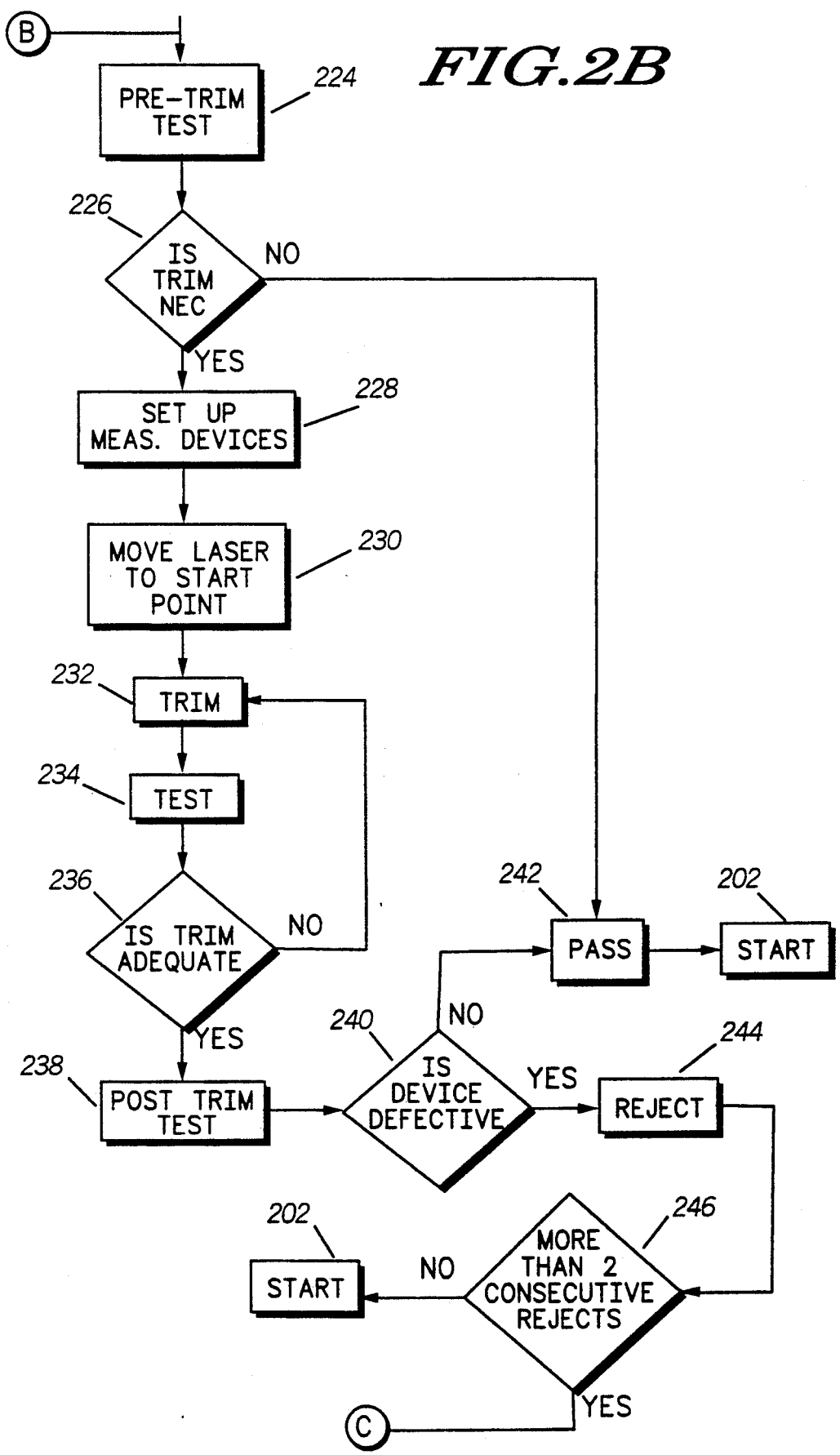

Referring to FIGS. 2A and 2B, a flow chart 200 of the operation of the apparatus 100 is shown in accordance with the present invention. For a better understanding of the present invention, the operation of the flow chart 200 will be described in combination with the elements of the automatic laser power correlation apparatus 100 as illustrated in FIGS. 1A and 1B. The operation of the flow chart 200 is described using the circuit carrying substrate 118 which contains a single target 112. Substrates with more than one target can be trimmed using the flow chart 200 repeated for each target.

From a start block 202, the operation controlled by the computer 1068 retrieves component laser data via the retrieve component laser data block 204. Data on a component to be trimmed is retrieved from a data bank associated with the computer 1068. The output of the block 204 is connected to a condition block 206 where a decision is made as to whether the power level of the laser beam 114 is equal to the laser power level retrieved from the data bank. The NO output of the condition block 206 is coupled to a block 210 where the laser power of the laser source 102 is adjusted to the power level retrieved from the data bank. The output of block 210 is branched to two blocks, an increment counter Y block 214 and a condition block 212. The condition block 212 decides whether the newly adjusted power level meats the power requirements retrieved form the data bank. The YES output of the decision block 212 is coupled to a reset timer X block 216 followed by a reset counter Y block 220. The NO output of the decision block 212 is coupled to the increment counter Y block 214. With the counter Y incremented by one, a decision is made as to whether its value is equal to three by a condition block 218. The NO output of the decision block 218 is routed back to block 210 and the loop is repeated. The YES output of the decision block 218 is coupled to a block 222 where the trimming process is stopped and an operator is notified of a possible equipment malfunction. The loop formed by blocks 210, 212, 214, and 218 is used to adjust the laser power level three times in order to achieve the level retrieved from the data bank by the computer 1068. Note that the counter Y is reset to zero via block 220 when the laser power level meats the retrieved power level. With this block, the counter Y can effectively keep track of the number of times the power adjustment routine is unsuccessfully implemented.

The output of the reset counter Y block 220 and the YES output of the decision block 206 are coupled to a condition block 208. At this condition block 208, a decision is made as to the length of time the laser power has not been correlated. This length of time is tracked by a timer X. The condition block 208 decides whether the elapsed time of the timer X is more than 4 hours. The YES output of the condition block 208 is coupled to block 210 where the laser power is readjusted. The NO output of the condition block 208 is coupled to a pre-trim test block 224, as shown in FIG. 2B.

Referring now to FIG. 2B, the block 224 is shown to include a pre-trim test. At the block 224, the target 112 is tested against a pre-determined set of parameters to determine if trimming is even necessary. This pre-test is conducted and concluded before the trimming of the target 112 has started. The block 224 is used to identify targets not requiring trim. The decision as to whether trimming is necessary is made by a condition block 226. The NO output of block 226 indicates that the target 112 is functioning properly without having to be trimmed. This NO output is coupled to a pass block 242 followed by the start block 202. The pass block 242 labels the circuit carrying substrate 118 under test as a working one and places it in the appropriate bin.

The YES output of the condition block 226 is coupled to a set up block 228 where the measurement devices are set up. A block 230 immediately following the set up block 228 moves the laser beam 114 to a start point on the target 112. The function of the block 230 is to calibrate the location of the laser beam 114 on the target 114. From this block 230 the system trims the target 112 and tests the circuit carrying substrate 118 via blocks 232 and 234 respectively. The output of block 234 is coupled to a condition block 236 where a decision on the adequacy of the trim is made. The NO output of the condition block 236 is routed back to the trim block 232. The loop produced by the three blocks 232, 234, and 236 continues until the trim is either adequate or no more trimming can be implemented. Both these conditions produce a YES at the condition block 236. This output is coupled to a post trim test block 238 which is followed by a condition block 240 where a decision is made as to whether the circuit carrying substrate 118 is defective. The NO output of the condition block 240 indicating that the substrate 118 is functioning properly is coupled to the pass block 242 followed by the start block 202. The YES output of the condition block 240 is coupled to a reject block 244 followed by a condition block 246. The reject block 244 is reached as the result of a defective target being trimmed. The condition block 246 questions the number of consecutive rejects and determines when this number is more than two. The NO output of block 246 returns the operation to the start block 202. The YES output is coupled to block 222 on FIG. 2A via connector C. At block 222 the operation is stopped and an operator is notified. The substrate 118 may have defective components which would result in the post trim test of block 238 not being successful. With this condition too, the substrate 118 is determined defective by the condition block 240.

In summary, the operational flow chart of trimming a target 112 on a circuit carrying substrate 118 using an automatic laser power correlation apparatus 100 is described. The operation retrieves component laser data from a data bank and proceeds to adjust the laser output power to meet retrieved level. A subroutine is provided to detect situations where the laser power can not reach the retrieved power level. The correlation of system is automatically repeated at a pre-determined rate, preferably every four hours. This is useful in situations where a large number of components being trimmed, require a common trim power level.

With this invention it is possible to trim components requiring various power levels automatically and without down time for manual power re-adjustments. A power detector is utilized to measure the laser power level and adjust the power level to meat the trimming power requirements using a feed back loop. It is no longer necessary for operators to interrupt the trimming process in order to adjust the laser power level. This invention will afford great flexibility to laser trimming apparatuses with increased speed.

What is claimed is:

1. An apparatus for trimming printed components on a circuit carrying substrate, comprising:
   means for retrieving trimming information, including power level requirements on a printed component from a data bank;
   trimming means having a beam with an adjustable power level for trimming the printed component;
   measuring means for selectively interrupting the beam for measuring the power level of the trimming means; and
   means responsive to the measuring means for selectively altering the power level of the trimming means to the level retrieved from the data bank.

2. The apparatus of claim 1, wherein the trimming means comprises a light resonator means.

3. The apparatus of claim 2, wherein the light resonator means comprises a laser source.

4. The apparatus of claim 1, wherein the measuring means comprises a voltmeter.

5. The apparatus of claim 1, wherein the measuring means comprises a digital voltmeter.

6. The apparatus of claim 1, wherein the measuring means comprises a converter means.

7. The apparatus of claim 5, wherein the converter means comprises a heat to electrical signal converter.

8. A method for trimming printed circuit components on a circuit carrying substrate, comprising the steps of:
   retrieving trimming information including power level requirements on a printed circuit component from a data bank;
   adjusting the power of a laser trimming device to the power level requirements retrieved from the data bank;
   activating the laser trimming device;
   measuring the power of the laser generated by the laser trimming device before it reaches the printed circuit component; and
   readjusting the power of the laser trim gun when necessary.

9. The method of claim 8, wherein the step of measuring the power includes interrupting the laser generated by the trimming device.

10. The method of claim 8, wherein the step of measuring the power includes converting the heat of the laser generated by the trimming device to an electrical signal.

11. The method of claim 8, wherein the step of readjusting the power is limited to three trials.

12. A laser trimming apparatus for varying the component value of a printed circuit component of a circuit carrying substrate requiring a pre-determined laser power level, the laser trimming apparatus having a laser source and comprising:
   power detector means for selectively detecting the power level of the laser source;
   power measuring means for measuring the power level of the laser source;
   comparator means for comparing the measured power level to the predetermined laser power level; and
   power adjustment means for selectively adjusting the power level of the laser source to meet the predetermined laser power level.

13. The apparatus of claim 12, wherein the power detector means is a heat to electricity converter.

14. The apparatus of claim 12, wherein the power measurement means is a voltmeter.

* * * * *